United States Patent
Alford et al.

(10) Patent No.: US 12,241,795 B2
(45) Date of Patent: Mar. 4, 2025

(54) GAS TEMPERATURE SENSOR WITH THERMALLY LUMINESCENT COMPOUNDS

(71) Applicant: TDA Research, Inc, Wheat Ridge, CO (US)

(72) Inventors: John M Alford, Lakewood, CO (US); David P Eisenberg, Denver, CO (US); Girish Srinivas, Broomfield, CO (US)

(73) Assignee: TDA Research, Inc., Golden, CO (US)

( * ) Notice: Subject to any disclaimer, the term of this patent is extended or adjusted under 35 U.S.C. 154(b) by 553 days.

(21) Appl. No.: 17/267,298

(22) PCT Filed: Jul. 19, 2019

(86) PCT No.: PCT/US2019/042624
§ 371 (c)(1),
(2) Date: Feb. 9, 2021

(87) PCT Pub. No.: WO2020/018916
PCT Pub. Date: Jan. 23, 2020

(65) Prior Publication Data
US 2021/0318184 A1    Oct. 14, 2021

Related U.S. Application Data

(60) Provisional application No. 62/700,594, filed on Jul. 19, 2018.

(51) Int. Cl.
*G01K 11/3213*    (2021.01)
*C09K 11/77*    (2006.01)

(52) U.S. Cl.
CPC ...... *G01K 11/3213* (2013.01); *C09K 11/7706* (2013.01)

(58) Field of Classification Search
CPC .................. G01K 11/3213; G01K 11/7706
(Continued)

(56) References Cited

U.S. PATENT DOCUMENTS

| | | | | |
|---|---|---|---|---|
| 4,075,493 A | * | 2/1978 | Wickersheim | G01J 5/60 374/161 |
| 6,746,149 B1 | * | 6/2004 | Chubb | G01K 11/14 374/161 |

FOREIGN PATENT DOCUMENTS

FR    2966978 A1 *    5/2012    ............ G01J 5/0862

OTHER PUBLICATIONS

Wade, Scott and William Baxter (2003) "The fluorescence intensity ratio technique for optical fiber point temperature sensing" Journal of Applied Physics • Oct. 2003 (Year: 2003).*

* cited by examiner

*Primary Examiner* — Natalie Huls
(74) *Attorney, Agent, or Firm* — Brian J. Elliott; Grace B. Clinger

(57) ABSTRACT

A thermally luminescent temperature sensor with a rare earth emitter having a first selective electromagnetic light energy emission band and a second selective electromagnetic light energy emission band in which the rare earth emitter converts thermal energy to electromagnetic light energy within the first and second selective energy emission bands. The sensor also has a selective optical detector in optical communication with the rare earth emitter, wherein the selective optical detector independently detects each the first and second selective electromagnetic light energy emission bands. Lastly, the thermally luminescent temperature sensor determines the temperature based on the electromagnetic light energy measured within the first and second selective energy emission bands relative to each other. Optionally additional emission bands may be used in the evaluation of the temperature.

20 Claims, 14 Drawing Sheets

(58) Field of Classification Search
USPC .......................................................... 374/161
See application file for complete search history.

GAS TEMPERATURE SENSOR WITH THERMALLY LUMINESCENT COMPOUNDS

CROSS REFERENCE TO RELATED APPLICATIONS

The present application claims the benefit of the U.S. provisional application No. 62/700,594 filed Jul. 19, 2018 (titled GAS TEMPERATURE SENSOR WITH THERMALLY LUMINESCENT COMPOUNDS, by Michael D. Alford, David P. Eisenberg and Girish Srinvas), which is incorporated by reference herein. The present application also claims the benefit of the PCT application number PCT/US19/42624 filed Jul. 19, 2019 (titled GAS TEMPERATURE SENSOR WITH THERMALLY LUMINESCENT COMPOUNDS, by Michael D. Alford, David P. Eisenberg and Girish Srinvas) which is incorporated by reference herein.

STATEMENT REGARDING U.S. GOVERNMENT SUPPORT

This invention was made in part using U.S. government funding through the U.S. Airforce SBIR Phase I contract #FA8650-18-P-2004. The government has certain rights in this invention.

BACKGROUND OF THE INVENTION

Since the gas turbine jet engine was introduced in 1937 its thrust, efficiency and reliability have continually improved. Much of this improvement comes from running the engines at higher temperatures and higher compression ratios. Operation at higher temperatures has been made possible by continual improvements in the materials used to build the engines New materials have been made from vacuum induction melting, hot isostatic pressing, single crystal superalloys, and thermal barrier coatings. Taken together, these technologies improved temperature resistance by more than 260° C. (500° F.). Given modern advancements in materials science and the advent of 3D printing of turbine blades with improved cooling channels, it is likely that the operating temperature can be improved even further.

Unfortunately, while technologies for higher temperature engines have improved dramatically, the technology needed for temperature sensing to properly monitor and control these engines has not kept pace. The exhaust gas temperature of the jet engine is a critical parameter that can be used to infer proper operation throughout the rest of the engine. Therefore, there is currently a vital need to have a reliable and accurate mechanism for sensing the exhaust gas temperature that can withstand the high temperatures of modern jet engines.

Existing temperature sensor cannot reliably measure temperatures in such a harsh environment (a combination of high temperatures, vibrations, and oxidizing environments). Although there are a variety of temperature sensors that work by different physical mechanisms, they all are limited for this application because this temperature sensor must be insensitive to electronic interference, it must be mechanically robust and insensitive to jet engine vibrations, and the sensor must work at extremely high temperatures (>1600° C.) while its connecting components and electronics package must function over the temperature range of the engine. As shown by previous research, making thermal sensors that can withstand exhaust gas temperatures is quite challenging. The prior art contains descriptions of temperature sensing technologies that are potentially useful in very high temperature gas streams, including: thermocouples, fiber optic fluorescence decay, optical fiber interferometry and birefringence, fiber optic ultrasound transmission, fiber optic blackbody thermometers (infrared thermometry or pyrometry), and fiber optic selective emitter thermometers. However, they all suffer from either a maximum operating temperature that is too low for modern jet engines, or that only provide poor accuracy in temperature measurement in this challenging environment.

Thermocouples are one of the most common and versatile temperature sensors. They are based on the thermoelectric effect (i.e., Seebeck effect) where a temperature gradient across a length of metal wire causes a small voltage or electromotive force (emf) across the wire. A thermocouple uses two wires of dissimilar metals (with different thermoelectric coefficients). One end is held at a common reference temperature (usually with a second junction so that the voltage is measured across identical wires) while the other end is connected in a junction at the temperature to be determined. The thermoelectric coefficients of the two metals and known along with the reference temperature, thus the temperature at the junction can be determined by measuring the voltage across the wires. Different thermocouple types are produced by using different pairs of metals to provide a wide range of sensitivities and temperature and chemical compatibilities.

Unfortunately, most thermocouples are incapable of measuring at temperatures necessary for gas turbine engine exhaust sensing. The highest temperature thermocouples that can be used in exhaust gases (an oxidizing environment) are types R, S, and B (platinum/rhodium alloys), with maximum temperatures of 1450° C., 1450° C. and 1700° C., respectively. When looking at thermocouple temperature specifications, many factors must be considered. While the type B thermocouple is capable of temperature sensing at >1600° C., and doesn't physically melt until 1810° C., reliability and reproducibility factors must be also be considered. Jet engines require thermocouples to work over a lifetime of 2000-4000 hours (and preferably longer) without degrading. Degradation mechanisms include: grain growth and embrittlement, erosion, slow oxidation or corrosion, inter-diffusion of the alloys, contamination, and other factors that cause the electromotive force to drift or cause mechanical degradation. When these factors are considered, the long term operating temperature, even for type B thermocouples, is generally much lower than 1600° C.

Unlike thermocouples, fiber optic temperature sensing doesn't rely on a voltage, so it is insensitive to electromagnetic interference. The use of sapphire (crystalline alumina) for the optical fiber allows operation to temperatures in excess of 1800° C. depending on specific conditions, such as mechanical forces on the sensor. Mechanical stress on fiber optics can distort the optical signal transduction and adversely affect the sensor's performance.

One type of fiber optic temperature sensor relies on crystals that fluoresce with a temperature dependent decay time. Various types of crystals will fluoresce when excited with a laser or LED, and the decay time of the phosphor is temperature dependent. A wide variety of phosphors have been used, such as spinel, ruby, alexandrite, emerald, and Cr-doped yttrium aluminum garnet (YAG) crystals. These fiber optic temperature sensors require active excitation (usually with a laser) of the phosphor crystal to start the decay process. What is problematic for high temperature sensors is that the fluorescent decay time becomes prohibitively short as the temperature increases. At moderate temperatures, decay lifetime is ~1 ms, but as the temperature increases past 700° C., the decay lifetime drops down below 0.1 ms. At the temperatures of interest (~1600° C.), the decay time is too fast for it to be measured using readily available and economical instrumentation (which is why fiber optic fluorescence thermometers are not used for extremely high temperature sensing.)

In another type of inferior optical temperature sensor, interferometry relies on the wave nature of light to produce an extremely sensitive method for measuring distances to angstroms or even less. Coherent light (light that has all its waves in phase) such as that from a laser source is sent down two pathways and then recombined. Depending upon the difference in length traveled in each path, the phase of the light will be different, and when recombined, interference fringes will result. As the path length changes, the fringes change, and this change can be measured photometrically to high precision. To develop a temperatures sensor, one of the pathways is heated, thus changing its length as it expands. This type of sensor is not effective in high temperature, high vibration environments such as jet engine exhaust.

Another inferior sensor is a blackbody fiber optic thermometer. In these sensors optical fibers are fitted with blackbody emitters on their ends. For molybdenum (to form the blackbody cavity) can be deposited on the end of a single crystal sapphire fiber. Blackbodies emit a consistent spectrum that is dependent upon their temperature according to Planck's law. By measuring the spectrum (or a few points within the spectrum), the temperature of an ideal blackbody can be determined. Since alumina has a melting temperature of 2050° C. and molybdenum has a melting temperature of 2623° C., under ideal conditions, this technique can be used up to very high temperatures. Unfortunately, the drawback of this type of sensor is that along with the blackbody, the hot fiber also emits light along its length. Models have been developed to account for this, but they require a known emittance and path length. Under well controlled environments, this is acceptable, but in harsh operating conditions, the surface can be fouled, causing the emittance to change. This throws off the calibration, hurting the sensor's accuracy. Also, since molybdenum is very sensitive to oxidation, the coating can become fouled, changing its emissivity and ability to form a blackbody cavity. In short, black body fiber optic thermometers can work at high temperatures, but they are difficult to implement and can produce inconsistent results.

U.S. Pat. No. 6,746,149 teaches a rare earth optical temperature sensor, but it suffers from inferior accuracy by only teaching the measurement of a single selective emission band. U.S. Pat. No. 6,746,149 fails to teach that it is possible that light contamination from other emission sources, including the light pipe used in the teaching, can interfere with the extremely light intensity dependent algorithm used to determine the temperature of the emitter (the algorithm is based on the $4^{th}$ power of the temperature). U.S. Pat. No. 6,746,149 is silent on any ways to avoid this accuracy problem. The rare earth optical temperature sensor developed by Chubb et al. (U.S. Pat. No. 6,746,149) uses the emission intensity from a single peak of a rare earth selective emitter to determine the temperature. This type of sensor is very difficult to use in practice. Firstly, any particular peak will have a limited temperature range where it will provide useful information. For example, the peak at 790 nm in Erbium is nearly imperceptible below 700° C. More importantly, determining temperature from a single peak will lead to a significantly less stable and less accurate temperature sensor. Any hot surfaces with a line of sight of the temperature probe will emit grey body radiation that will combine with the signal from the single peak, artificially inflating the measured temperature. Similarly, any signal loss on the way from the emitter to the sensor (such as a bend or a scratch in the light pipe) will cause the measured temperature to be artificially lower.

For measurement of high temperatures in turbine engines, each of these above methods has drawbacks. In general, conventional thermocouple junctions formed from metal or metal alloys are not suitable for extended use at these temperatures, and optical methods using refractory materials such as alumina and sapphire are required. While some of the above referenced optical methods are capable of operating at high temperatures in very stable and controlled environments, all have serious limitations in harsh environments and suffer from poor accuracy, poor longevity or poor performance.

BRIEF SUMMARY OF THE INVENTION

The present invention solves the above limitations by providing a temperature sensor that can operate at very high temperatures (>1,600° C.) and that is accurate in harsh environments. The sensor of the present invention solves the limitations of the prior art by teaching a thermally luminescent temperature sensor that uses at least two selective peak emissions and their measured light intensity relative to one another to more accurately evaluate the temperate and avoid inaccuracies caused by mechanical vibrations, chemical fouling or unwanted grey body emission obscuring the emissions from a rare earth emitter. Grey body radiation will have a very similar effect on all emission peaks, so evaluating the relative emission at two or more peaks reduces or eliminates this unwanted light from the measurement. For example the ratio of the height or area of two peaks will cancel out the grey body radiation, eliminating its impact on the measured temperature. Alternatively, the difference between the area or height of two peaks will also cancel out the grey body radiation Similarly, signal loss due to bends or scratches in the light pipe will have the same effect on both peaks, so the ratio or difference will cancel out that effect on the measured temperature. Furthermore, the present invention also teaches that a ratio of peaks in the NIR range can be used for measuring temperature from 250° C.-700° C. and a separate ratio of two peaks in the visible light range can be used for measuring temperature from 700° C.-1800° C., giving the temperature sensor of the present invention a very wide range from 250° C.-1800° C. for accurate temperature measurement.

In one embodiment, the invention provides a reliable, accurate, and easy to use fiber optic temperature sensor composed of refractory ceramic materials. It is capable of sensing temperatures up to 1700° C., and optionally higher. It has a small footprint, a short response time, and requires minimal power. It employs a temperature sensing mechanism based upon thermally induced optical emissions from f-orbital transitions of selected rare earth elements. These emissions do not rely on the emissivity of any surfaces that can be fouled, oxidized, or corroded during operation, making it very robust and easy to implement. The sensor provides a simple, reliable, and accurate sensing mechanism, even in gas turbine exhaust streams at extremely high temperatures.

Rare earth ceramic oxides are not black or gray body emitters over the temperature range of interest. Instead, they emit light with peaks at particular frequencies, which are independent of temperature. However, the intensity of the emission at those peaks is temperature dependent. By measuring the intensity ratio of multiple emission peaks (or the difference of two emission peaks), the temperature can be computed in a manner that is insensitive to variations in overall light intensity. In an embodiment a sensor is made by depositing one or more of these multi-peak rare earths onto the end of a high temperature sapphire optical fiber that has a melting temperature of >2000° C. and is rated for continuous use at 1700° C. Light emitted from the rare earth tip is conducted down the fiber and analyzed in a spectrophotometer. The ratio of the intensities of selected peaks determines the temperature based on the light emitted by the fiber. In an alternative embodiment the spectrophotometer is replaced by a printed circuit board with photodiodes and optical filters to produce a low cost, small footprint fiber optic temperature sensor.

The invention provides a thermally luminescent temperature sensor, comprising: a rare earth emitter having a first selective electromagnetic light energy emission band and a second selective electromagnetic light energy emission band, wherein, in response to a temperature, the rare earth emitter converts thermal energy to electromagnetic light energy within the first selective energy emission band and electromagnetic light energy within the second selective energy emission band; a selective optical detector in optical communication with the rare earth emitter, wherein the selective optical detector independently detects each of the first selective electromagnetic light energy emission band and the second selective electromagnetic light energy emission band; and wherein the thermally luminescent temperature sensor determines the temperature based on the electromagnetic light energy measured within the first selective energy emission band relative to the electromagnetic light energy measured within the second selective energy emission band. Optionally, the thermally luminescent temperature sensor determines the temperature using an algorithm that comprises the ratio of the electromagnetic light energy within the first selective energy emission band to the electromagnetic light energy within the second selective energy emission band. In another alternative embodiment, the thermally luminescent temperature sensor determines the temperature using an algorithm that comprises the difference of the electromagnetic light energy within the first selective energy emission band and the electromagnetic light energy within the second selective energy emission band. Other algorithms are possible that include expressions of two or more peak relative to each other.

In a preferred embodiment, the rare earth emitter comprises a rare earth aluminum garnet, such as $Er_3Al_5O_{12}$. This erbium aluminum garnet has a first selective electromagnetic light energy band is centered at 790 nm and the second selective electromagnetic light energy band is centered at 964 nm. In preferred embodiments the thermally luminescent temperature sensor measures a first selective electromagnetic light energy band and the second selective electromagnetic light energy band each having a bandwidth of at most 50 nm, more preferably of at most 25 nm, even more preferably of at most 5 nm and most preferably of at most 2.5 nm.

In an optional embodiment the emitter and the detector are connected by an optical transmission device. For example, a light pipe having a first end and a second end, the first end communicating with the rare earth emitter and the second end communicating with the selective optical detector. The light pipe is preferably a sapphire optical fiber and any high temperature fiber cladding or housing structure such as an alumina tube.

In a further embodiment, the invention teaches a thermally luminescent temperature sensor, comprising: a rare earth emitter having a first selective electromagnetic light energy emission band, a second selective electromagnetic light energy emission band, a third selective electromagnetic light energy emission band, and a fourth selective electromagnetic light energy emission band, wherein, in response to a temperature, the rare earth emitter converts thermal energy to electromagnetic light energy within the first selective energy emission band, the second selective electromagnetic light energy emission band, the third selective electromagnetic light energy emission band, and the fourth selective electromagnetic light energy emission band; a selective optical detector in optical communication with the rare earth emitter, wherein the selective optical detector independently detects each the first selective electromagnetic light energy emission band, the second selective electromagnetic light energy emission band, the third selective electromagnetic light energy emission band, and the fourth selective electromagnetic light energy emission band; and wherein the thermally luminescent temperature sensor determines the temperature based on the electromagnetic light energy measured within the first selective energy emission band relative to the electromagnetic light energy measured within the second selective energy emission band, and the electromagnetic light energy measured within the third selective energy emission band relative to the electromagnetic light energy measured within the fourth selective energy emission band.

The above sensor may determines the temperature using an algorithm that comprises the ratio of the electromagnetic light energy within the first selective energy emission band to the electromagnetic light energy within the second selective energy emission band, or by an algorithm that comprises the difference of the electromagnetic light energy within the first selective energy emission band and the electromagnetic light energy within the second selective energy emission band.

In further embodiments, the thermally luminescent temperature sensor may evaluate the temperature using an algorithm that comprises the ratio of the energy within the first selective electromagnetic light energy emission band to the energy within the second selective electromagnetic light energy emission band and the ratio of the third selective electromagnetic light energy emission band to the fourth selective electromagnetic light energy emission band.

The thermally luminescent temperature sensor may have a rare earth emitter that comprises a rare earth aluminum garnet, such as $Er_3Al_5O_{12}$. In an optional embodiment using four separate emission peaks, the thermally luminescent temperature sensor has first selective electromagnetic light energy band is centered at 790 nm, the second selective electromagnetic light energy band is centered at 964 nm, the third selective electromagnetic light energy band is centered at 1470 nm, and the fourth selective electromagnetic light energy band is centered at 1615 nm. These emission bands preferably have a bandwidth of at most 50 nm, more preferably of at most 25 nm, even more preferably of at most 5 nm and most preferably of at most 2.5 nm.

The thermally luminescent temperature sensor using four or more separate emission bands, optionally further comprises a light pipe having a first end and a second end, the first end communicating with the rare earth emitter and the second end communicating with the selective optical detector, and the light pipe is preferably a sapphire optical fiber. The selective optical detector may further comprise an optical splitter, at least two visible photodiodes and at least two near-infrared photodiodes.

DETAILED DESCRIPTION OF THE INVENTION

The present invention provides a temperature measuring device that uses either the ratio, the difference, or another expression relating two or more peaks of the thermal luminescence from rare earth (RE) atoms. Compared to the prior art in the Background section, the temperature sensor can more accurately measure combustion gas streams, especially at temperatures greater than 1600° C. Many rare earth compounds emit light at specific frequencies when heated, and the intensity of this light is temperature dependent in a manner different from ordinary blackbody emission. Therefore, the rare earth emission used by the sensor of the present invention can form the basis of a new type of temperature sensor with several advantages over conventional thermocouples and blackbody pyrometers; it is accurate, can survive very high temperature strongly oxidizing environments, and can be made to withstand high mechanical stresses and prolonged vibration. The sensor can use a rare earth element (there are 17 rare earth elements, each with different emission properties) in a crystalline structure that is stable in the exhaust gas temperatures. IT is important that the rare earth exist in a crystalline structure because the emission bands of crystalline rare earth compounds are much narrower than the emissions of amorphous (such as glassy) rare earth compounds. The emitted light of two or more emission bands must then be directed to or guided to an electro optical detector to determine the temperature using a relation between at least two emission peaks.

Rare earth ceramic oxides are not black or gray body emitters over the temperature range of interest for a temperature sensor. Instead, they emit light with peaks at particular frequencies, and these frequencies are independent of temperature. However, the intensity of the emission at those peaks is temperature dependent in a manner different than blackbody emission. By measuring the intensity ratio of multiple emission peaks, the temperature can be computed in a manner that is insensitive to variations in overall light intensity. Several of the rare earths (Tm, Ho, Yb, Nd, Dy, and Er) emit at multiple peaks, have oxides or other ceramic compounds with melting points in excess of 2000° C., and are suitable for constructing temperature sensors.

Figure 1:
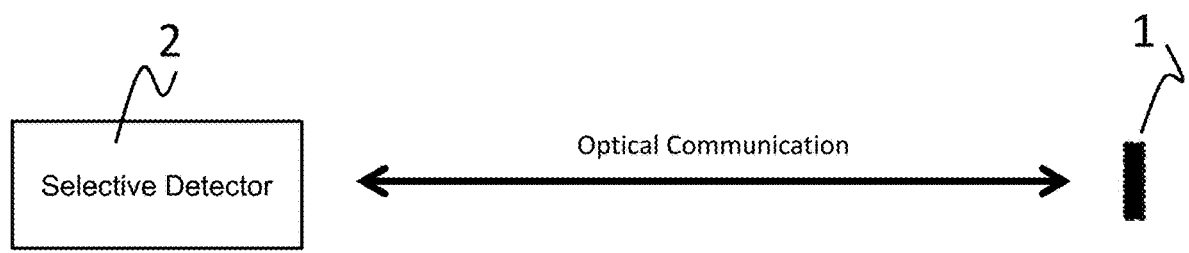
FIG. 1. Illustration of the thermal sensor main components in optical communication with each other.
Figure 2:
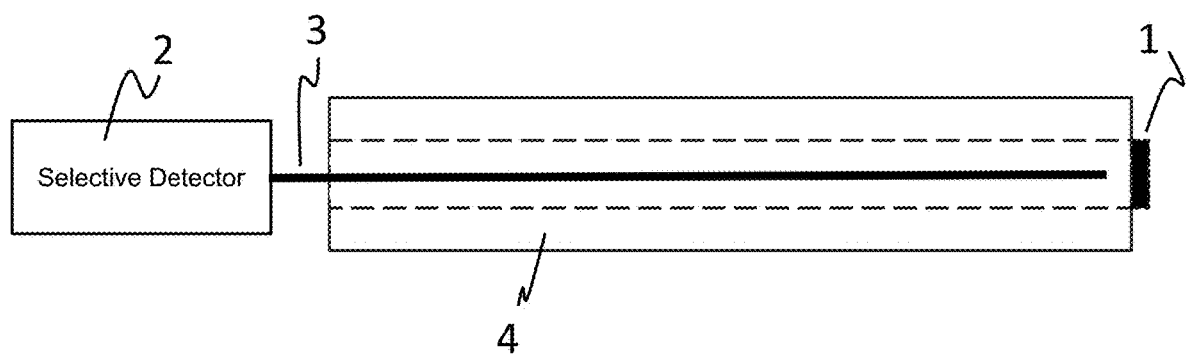
FIG. 2. Example of a thermal sensor with a light pipe connecting the emitter and detector.
Figure 4:
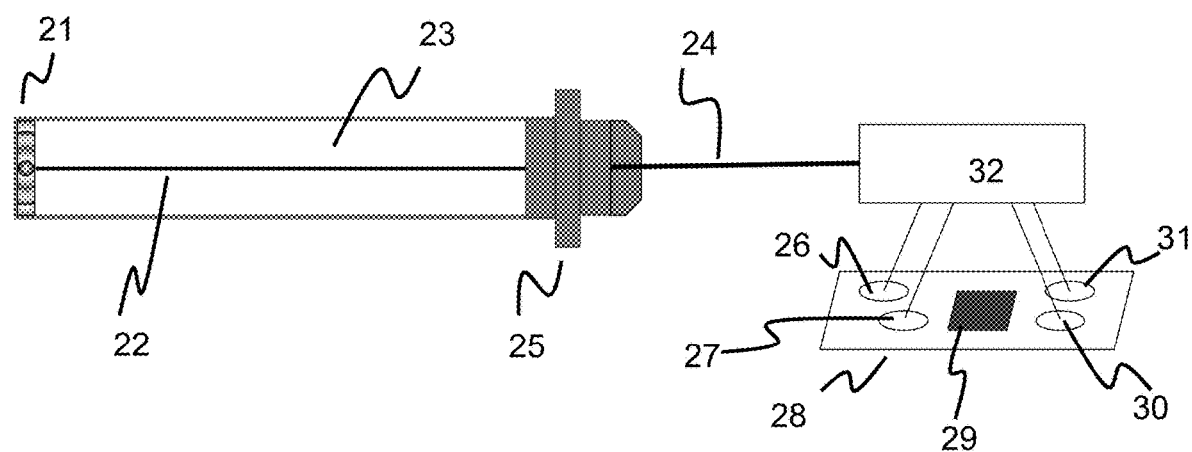
FIG. 4. Thermal sensor with high temperature emitter, light guide, splitter and detector with multiple photodiodes.
Figure 5:
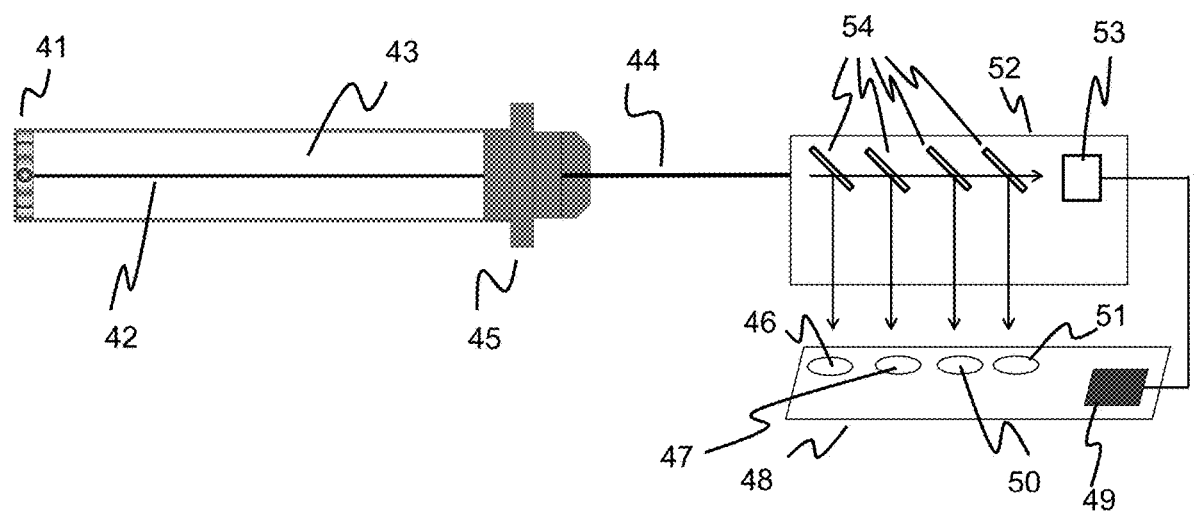
FIG. 5. Thermal sensor with high temperature emitter, light guide, dichroic mirror-based splitter and detector with multiple photodiodes.

The overall concept of our temperature sensor is shown in FIG. 1 and FIG. 2. Light in narrow emission bands is emitted by the rare earth sensing element 1 in optical communication with a selective optical detector 2. There may optionally be a protection tube 4 and a sapphire optical fiber 3. Other light pipes may alternatively be used. The light from the emitter may be transmitted down a sapphire optical fiber to a cooler end of the sensor where it can be transferred using a fiber optic coupler to a more conventional high temperature silica optical fiber. The sapphire fiber and silica fiber may be joined to the connector using a suitable high temperature method such as high temperature epoxy or soldering. The silica fiber may be clad in a high temperature insulation, such as Kapton®, and sheathed in an industrial steel coax cable guides the light to a remote detector. Inside the detector, the beam exiting the fiber can be collimated and then each desired emission band isolated with a dichroic mirror or narrow bandpass filter and then sent to a photodiode detector. Such a splitter is shown in FIG. 4 or FIG. 5. After amplification and filtering, the signal from each band can be converted to binary form and a computer can perform an algorithm, perform a function in a look-up table or other expression that is a relation of two or more peaks to compute the temperature at the rare earth emitter.

Figure 3:
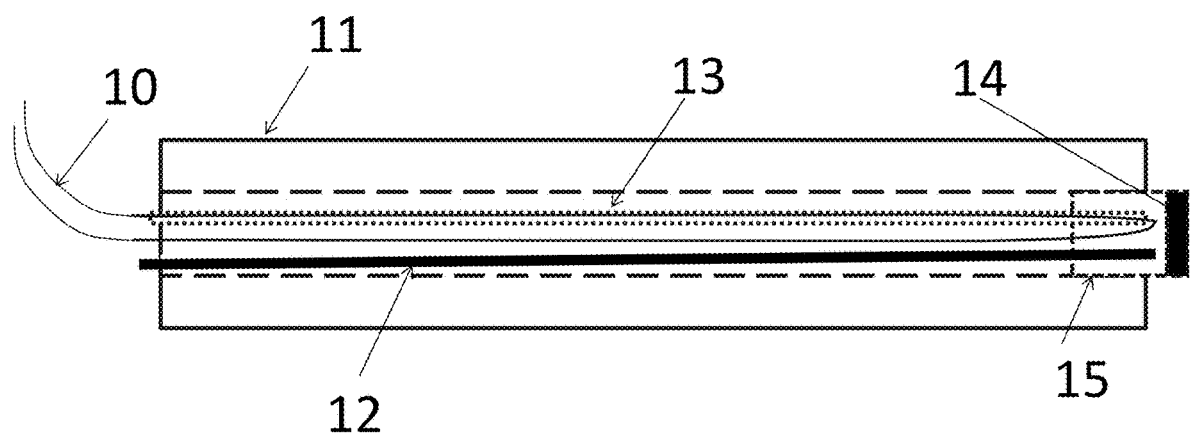
FIG. 3. Example of an optical thermal sensor also having a thermocouple for use during experimentation and calibration.

A developmental version of the sensor as shown in FIG. 3 can be used to calibrate the temperature response of the sensor. A type B thermocouple 10 is inserted through a 0.027" $AlO_2$ tube ¼" $AlO_2$ tube, and the end is located near the ErAG (erbium aluminum garnet) Plug 14. A sapphire fiber 12 is also contained inside a ⅛" $AlO_2$ tube 15, all of which is housed inside a ¼ " $AlO_2$ outer tube 11.

FIG. 4 shows a preferred temperature sensor design. The ErAG emitter 21 is in optical communication with a sapphire fiber 22 and contained in an alumina or sapphire tube 23. The tube 23 and fiber 22 terminate at an optical connector 25, which is also connected to a low temperature silica fiber 24 (all in optical communication back to the rare earth emitter 21. The low temperature fiber 24 is connected to an optical splitter 32 and the light emitted from the emitter is selectively split, and four selective emission bands are directed to four photodiodes 26, 27, 30, and 31. The first photodiode 26 has a 790 nm filter with a visible light diode, the second photodiode 27 has a 964 nm filter with a visible light diode, the third photodiode 30 has a 1615 nm filter with a near-infrared photodiode, and the fourth photodiode 31 has a 1470 nm near-infrared photodiode. The four photodiodes are positioned on a printed circuit board 28, which also contains a microprocessor 29, a non-limiting example is a Raspberry Pi® processor.

FIG. 5 shows an alternative embodiment where the optical detector comprises dichromic mirrors to split the emitted light. The ErAG emitter 41 is in optical communication with a sapphire fiber 42 and contained in an alumina or sapphire tube 43. The tube 43 and fiber 42 terminate at an optical connector 45, which is also connected to a low temperature silica fiber 44 (all in optical communication back to the rare earth emitter 41. The low temperature fiber 44 is connected to an optical splitter 52 and the light emitted from the emitter is selectively split using dichroic mirrors 54, and four selective emission bands are directed to four photodiodes 46, 47, 50, and 51. The first photodiode 46 has a 790 nm filter with a visible light diode, the second photodiode 47 has a 964 nm filter with a visible light diode, the third photodiode 50 has a 1615 nm filter with a near-infrared photodiode, and the fourth photodiode 51 has a 1470 nm near-infrared photodiode. The four photodiodes are positioned on a printed circuit board 48, which also contains a microprocessor 49. A reference optical light detector 53 is also operably connected to the microprocessor 49.

Figure 6:
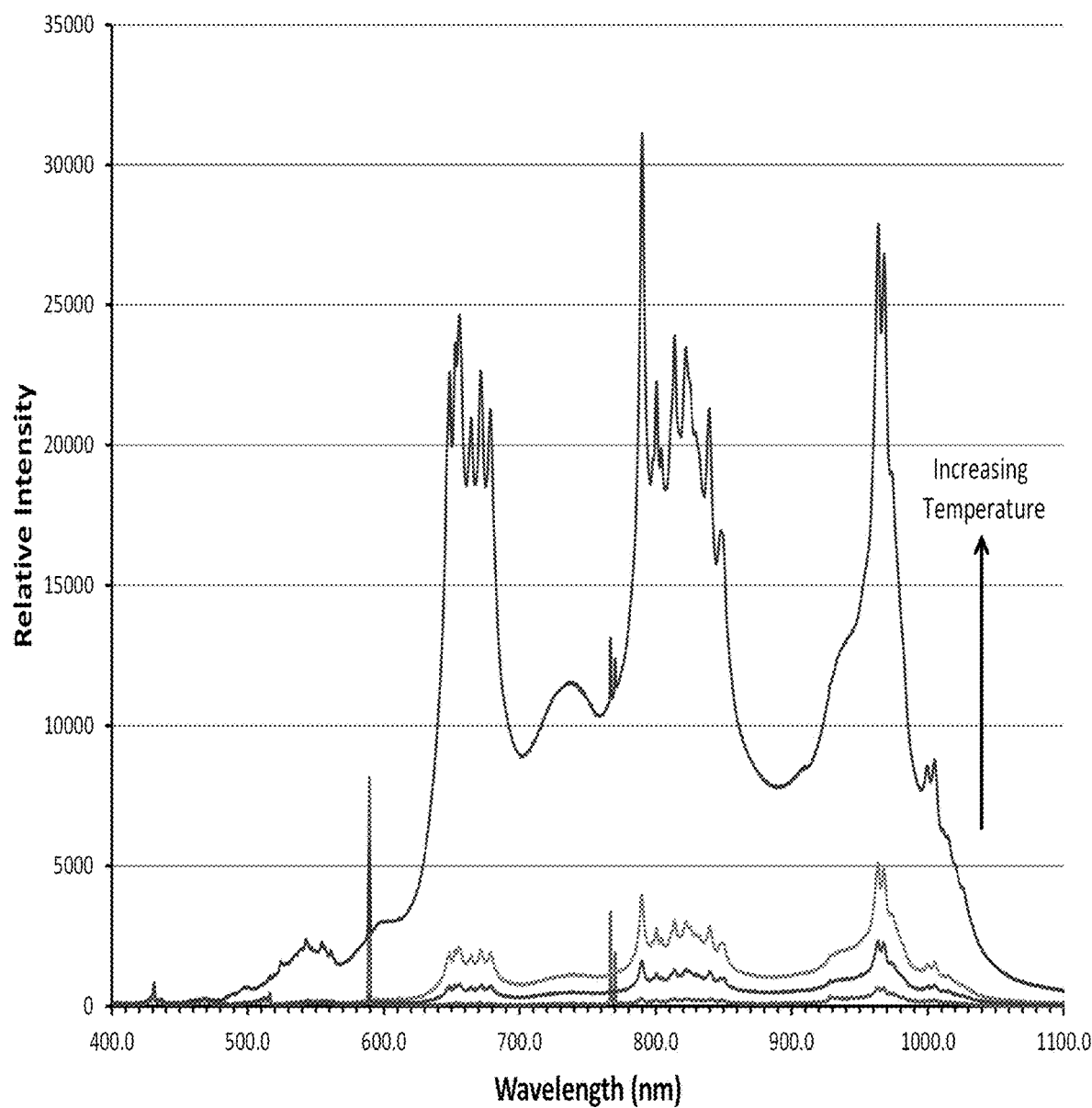
FIG. 6. Electromagnetic light emission spectrum for erbium aluminum garnet crystals at varying temperatures.

The preferred rare earth element is erbium (Er) due to its large number of narrow emission bands located across a wide spectral range from 500 nm to 1700 nm. This large number of bands provides many possible intensity ratios to investigate as a function of temperature that can be used to make a sensor that is effective over a wide temperature range. A thermal sensor described below was fabricated by incorporating erbium into an erbium aluminum garnet (ErAG), $Er_3Al_5O_{12}$, using sol gel processing chemistry. After high temperature firing, the production of highly crystalline ErAG was verified using x-ray crystallography. The ErAG was also characterized with an optical spectrometer to verify its optical transitions (FIG. 6).

One method to produce a crystalline rare earth emitter is by sol-gel processing. The sol-gel technique can be used to deposit a thermally luminescent material such as $Er^{3+}$ ceramic onto silica, alumina or more preferably sapphire fibers. Sol-gel chemistry is a wet chemical synthesis method that involves the condensation of metal-oxide precursors into a colloidal solution of nanoparticles (sol). Furthermore, if condensation of the metal oxide is stopped prior to gelation, the resulting colloidal sol can be used as a coating solution for forming surface coatings with an extremely variable range of properties and compositions. Sintering at higher temperatures produces a uniform, dense ceramic. The versatility of sol-gel chemistry provides a means of controlling the shape, morphology and textual properties of the final material.

Sol-gel process for ErAG: because of its thermal emission spectra (FIG. 6) erbium is a preferred material for the sensor of the present invention. More specifically, a preferred material is ErAG (Erbium-Aluminum-Garnet, $Er_3Al_5O_{12}$).

Sol-gels can be produced in either water or organic solvents. The preferred method is using the organic solvent diethylene glycol monoethyl ether (DEGEE). This is a high boiling solvent that is eco-friendly, safe, and routinely employed in cosmetic products.

Using DEGEE, fully hydrated erbium nitrite was added to DEGEE at 90° C. under argon and stirred for 30 minutes. Aluminum sec-butoxide was then added, followed by acetic acid 30 minutes later. The molar ratios of Er:Al:acid:DEGEE were 0.1:1:3:20. Addition of the acid catalyzes the hydrolysis of the sec-butoxide groups on the aluminum, forming sec-butyl alcohol (sec-butanol) and aluminum oxide hydroxide nanoparticles with intercalated/adsorbed $Er^{3+}$ ions. After 6 hours at 90° C., the mixture was cooled to ambient temperature, following which the sec-butanol was removed under vacuum. The resulting sol is clear and stable for days (at least) at room temperature. The solution contains nanoparticles in the 10-20 nm size range, and it is normally filtered through a 200 nm membrane filter before use. Any pink color is due to the $Er^{3+}$ ion absorption peak at 520 nm (green).

Calcination of powders produced from the sol at various temperatures shows that ErAG forms between 800-900° C., and the conversion appears to be substantially complete by ca. 900-1000° C. Firing at higher temperatures does not affect the XRD pattern. The x-ray patterns showed that the material was primarily ErAG with trace amounts of $(Er,Al)_2O_3$, (α-alumina with intercalated Er ions).

The sol-gel method on sapphire substrates: The sol gel can also be deposited on sapphire windows. The sol gel is deposited by spin coating onto the alumina substrate (to produce a thin, even coating), and then heated it up to a particular temperature in order to solidify it. Multiple layers can be deposited by repeating the process for depositing a single layer. After approximately 5-10 layers (~1 μm thickness), features of the ErAG optical absorption peaks could be identified using a Perkin Elmer Lambda 19 UV/Vis/NIR spectrophotometer. These test show that the sol-gel performs as expected, but that thicker films are preferred to generate enough detectable emission.

Spectral measurements of the ErAG: In an embodiment, the Erbium is not in the glassy phase, rather is it made by a sol-gel method that produces Erbium in the pure crystalline garnet phase as shown by XRD. Optical transitions of rare earth f-orbitals are highly sensitive to the local electric fields described by crystal field theory. Glassy materials are amorphous, so the spectral lines visible are considerably broader and may include different transitions than the ones that the rare earths will emit using a crystalline form. Thus glassy rare earth emitters are inferior. In the present invention the sol-gel deposition process makes the spectra more accurate. Alternatively other Lanthanides in a crystalline form can be used as the thermally luminescent material, including neodymium, dysprosium, holmium, thulium, ytterbium and other crystalline forms of erbium. The sol gel can also be produced from mixtures of lanthanides producing a multi-lanthanide crystal a lanthanide crystal for a first lanthanide that is also doped with a second lanthanide. To obtain better spectra, a thicker film is preferred. A test jig representing a thermometer sensor can be used (see FIG. 3). For tests a 400 μm silica optical fiber can be used or a higher temperature tolerant sapphire fiber. A silica fiber may be produced by removing kapton® insulation with hot sulfuric acid and then inserting the uncoated fiber into a high purity alumina thermocouple insulation tube.

The end of the tube can then be packed with about 0.5 mm of ErAG powder (or other crystalline lanthanide powder) made from the above sol-gel process. The powder can be calcined (for example at 1700° C.) and then analyzed by XRD analysis. The other end of the fiber can be connected to a spectrometer (Mightex USB) for emission testing. Silica (fused quartz) can be employed to test up to 1100-1200° C. while sapphire can be employed to test up to 1900° C.

To test the emission spectrum, the ErAG end was heated with a methyl acetylene propane (MAP) torch. Pinkish red light emission from the ErAG should be evident, since pure alumina (or sapphire) has very little blackbody emission in the visible spectrum. As the temperature rises, the emission will become more yellow orange and appear more like a blackbody, but this is due to the change in relative spectral emission intensities rather than blackbody emission.

Figure 7:
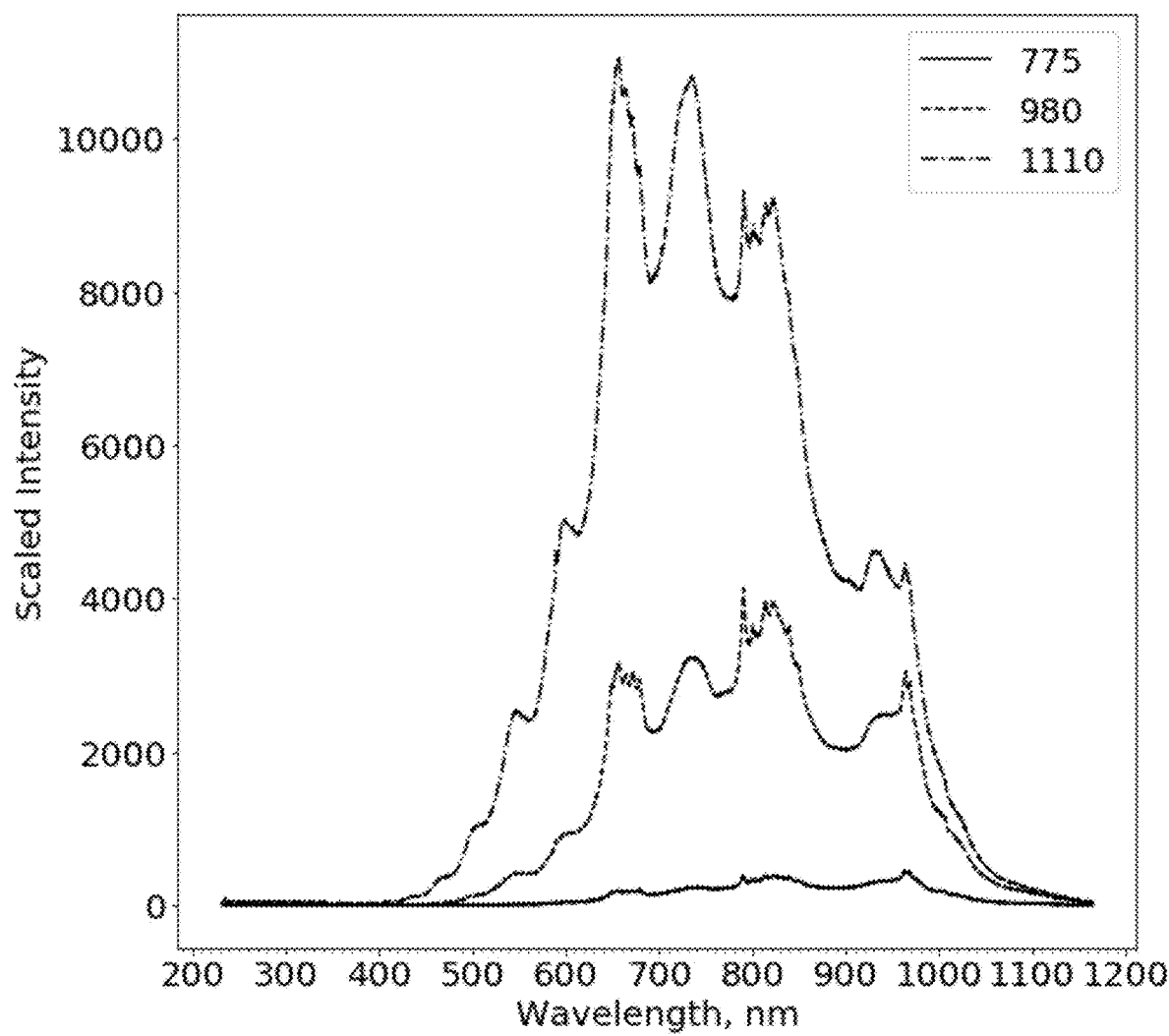
FIG. 7. Electromagnetic light emission spectrum obtained for erbium aluminum garnet crystals at varying temperatures using the temperature sensor of FIG. 3.
Figure 9:
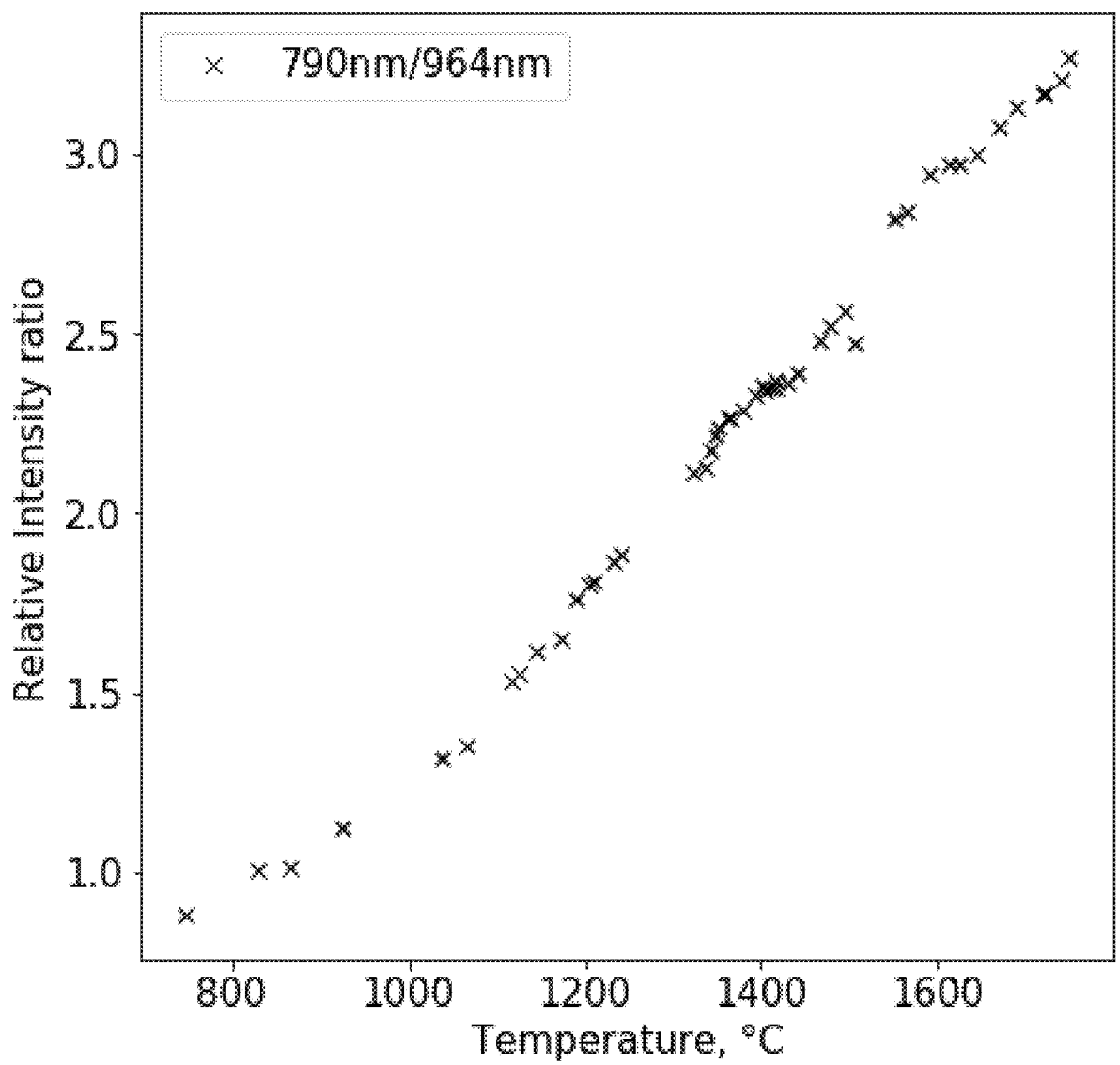
FIG. 9. Using sensor of FIG. 3, the ratio of the light intensity at 790 nm to 964 nm as a function of temperature.
Figure 10:
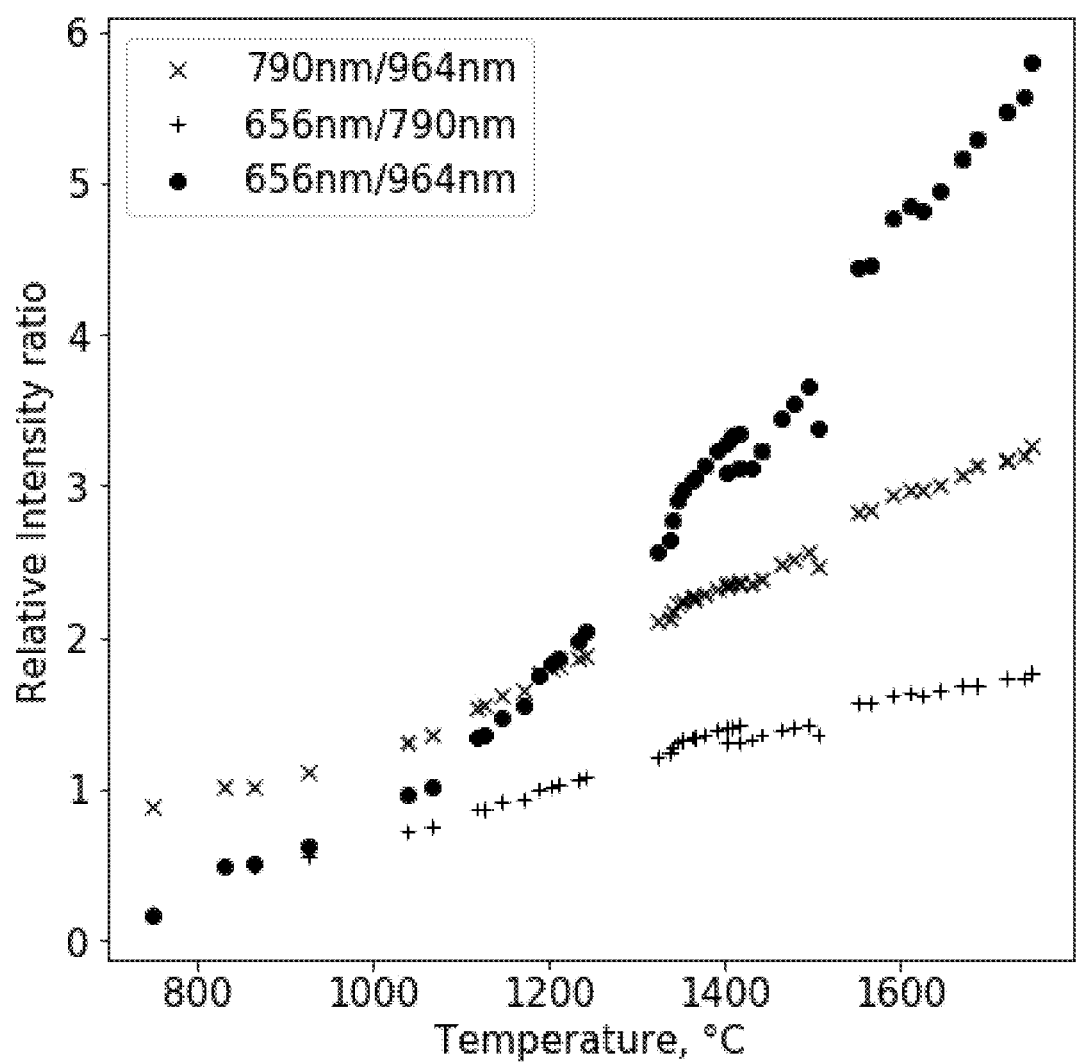
FIG. 10. Using sensor of FIG. 3, there different ratios of the light intensity (790 nm to 964 nm; 656 nm to 790 nm; and 656 nm to 964 nm) as a function of temperature.

Since the end of the optical fiber is flush with ErAG powder, the emitted light is readily transferred to the spectrometer for spectral analysis as shown in FIG. 4 and FIG. 5. Close inspection of the spectra at different temperatures (FIG. 7 and FIG. 8) shows that the intensities of different transitions both increase (and in some cases decrease) and the ratios of the intensities also change. This shows that it is possible to fit the intensities of different transitions or their ratios as a function of temperature and then invert this to give the temperature as function of intensities (See FIG. 9, FIG. 10 and FIG. 11).

ErAG and other lanthanide oxides that are made using a sol gel process or other preparation methods, such as single crystal growth, which results in a crystalline material and that emits thermal luminescence in a manner that is temperature dependent can be used in the high temperature sensor of the present invention.

Example 1: testing the temperature sensor with a MAP torch and an oxy-acetylene torch. We tested the sensor using a MAP torch from 700° C. to 1400° C. and used an oxy-acetylene torch from 1100° C. to 1750° C. We adjusted the temperature by moving the sensor closer or further away from the flame. The Oxy-acetylene torch can burn at 3480° C., which is hot enough to melt the alumina tube protecting the sapphire fiber (See FIG. 3). We prevented this by keeping the sensor very far from the flame base (frequently more than 12" away).

Figure 8:
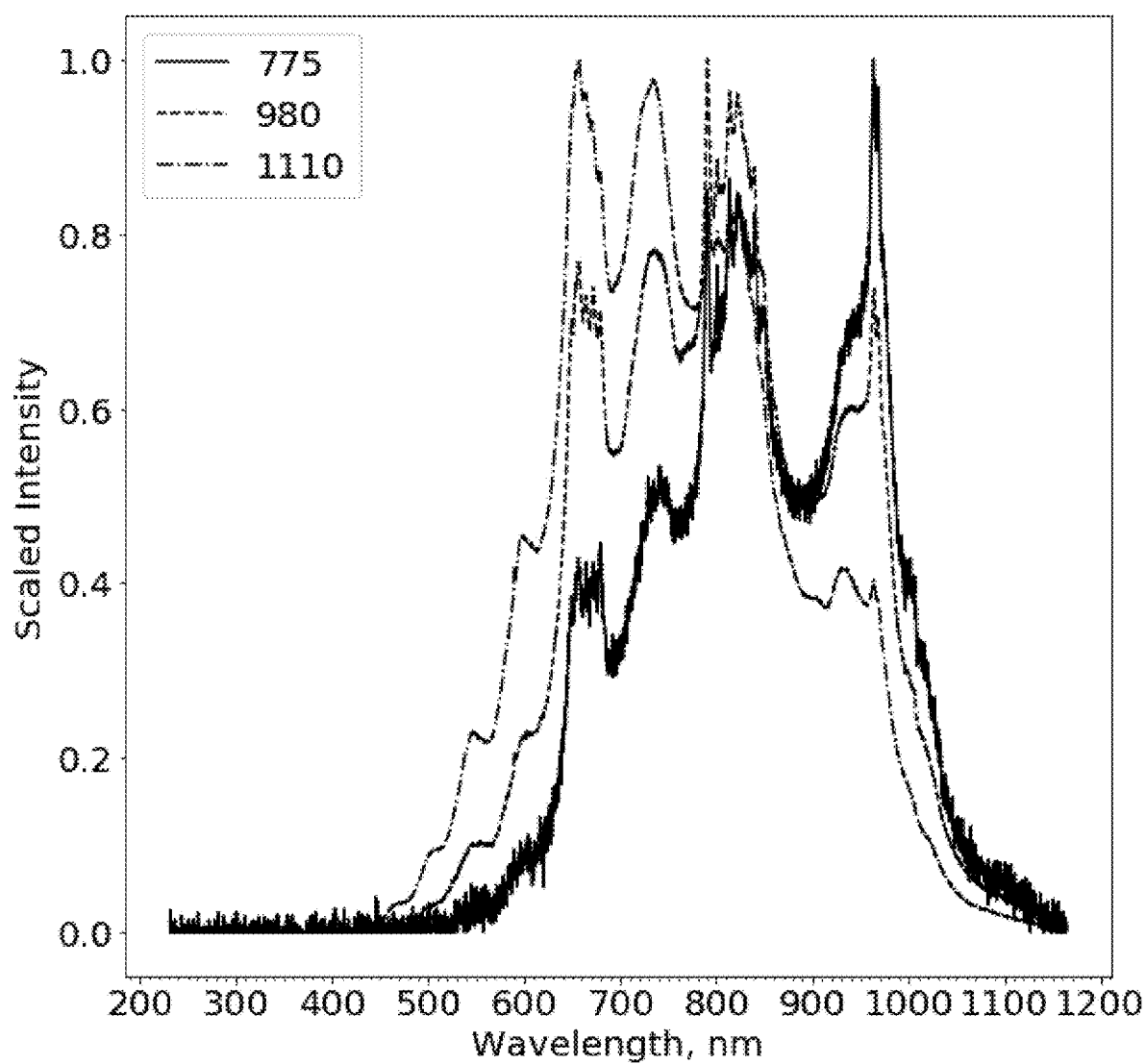
FIG. 8. Scaled electromagnetic light emission spectrum (all spectra scaled to maximum peak equal to 1.0) obtained for erbium aluminum garnet crystals at varying temperatures using the temperature sensor of FIG. 3.
Figure 14:
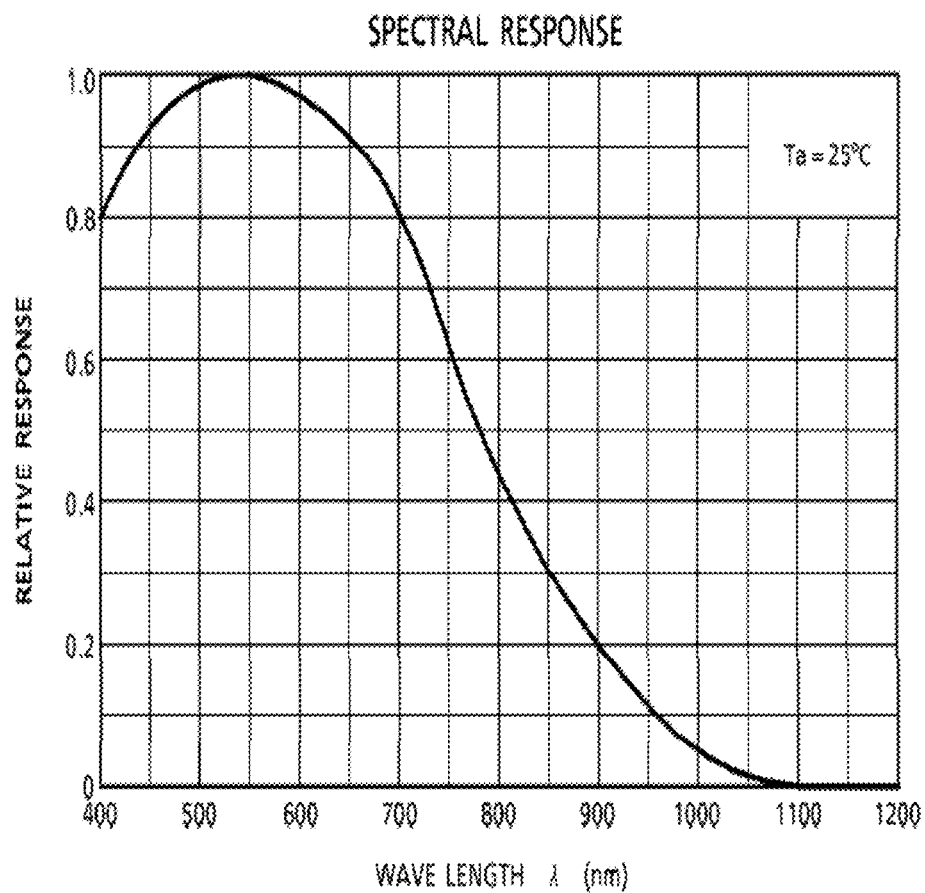
FIG. 14. Blackbody emission spectrum.

We inserted the sensor tip into the flame at a given height above the flame, and waited for the temperature as measured by the B-type thermocouple to stabilize. Since the flame is fairly narrow and the sensor is held far away from it (generally more than 12" from the base of the flame), the experiment was repeated many times, with the sensor at varying heights. The emission spectrum from 1000° C. to 1750° C. are shown in FIG. 8. This spectrum looks significantly different than a blackbody spectrum (FIG. 14), especially at the higher wavelengths such as 790 nm and 964 nm. This shows that when the sensor is subjected to a hot gas stream (instead of inserted into a furnace cavity), that it accurately measure the ErAG emission spectrum, instead of just blackbody radiation from the surroundings, because the relative emission peak heights will be unaffected by the black body emission (or the relative amount, ratios or differences, will be less affected by the light interference from blackbodies than a single emission band measurement that has no way to determine that any blackbody emission has contaminated the optical input to the detector.

The most useful visible light peaks in this data are 656 nm, 790 nm, and 964 nm. There are three possible combinations of ratios of the relative intensities of these three peaks, which are all plotted against temperature measured by the B-type thermocouple in FIG. 10. The ratio of the intensity of the 790 nm peak to the intensity of the 964 nm peak the preferred ratio to use and is shown by itself in FIG. 9. This curve shows a surprisingly linear response across a wide temperature range with excellent reproducibility. With any or all of these three curves it is possible to make a ErAG based fiber optic temperature sensor for temperatures from 700° C. to 1750° C. and possibly higher, all using optical detectors in the visible light range.

Figure 11:
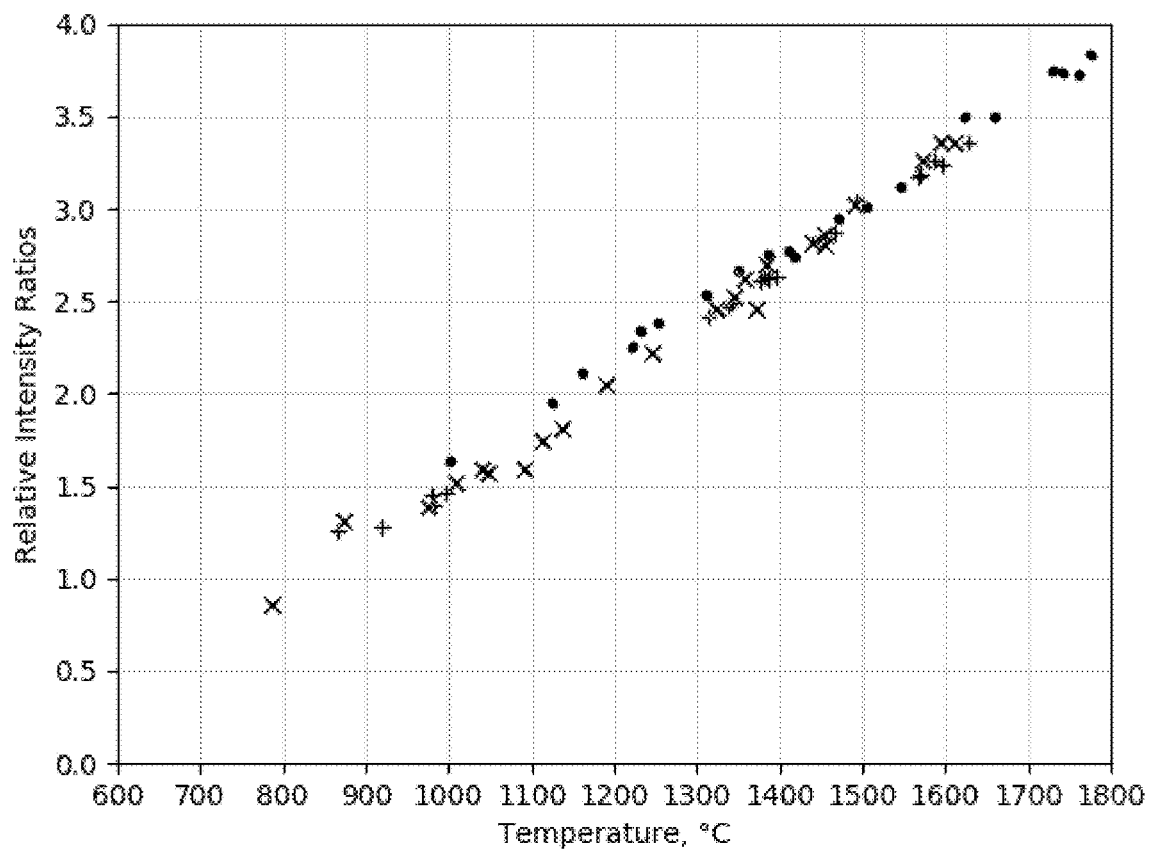
FIG. 11. Using sensor of FIG. 3, the ratio of the light intensity at 790 nm to 964 nm as a function of temperature from three separate data set (overlaid).

Example 2: Testing Thermocouple with Propane Oxygen Torch. The temperature sensor shown in FIG. 3 was tested using a propane oxygen torch in a very similar manner as the oxy-acetylene torch of Example 1. The main difference was that instead of moving the torch tip up and down, torch was left in place, and we adjusted the flow rates of oxygen, nitrogen, and propane to change the temperature. This allowed us to calibrate the sensor more reproducibly than before, and collect more precise data. FIG. 11 shows the ratio of the 790 nm light compared to the 964 nm light collected using our propane oxygen torch collected in three separate sets (x's, +'s, circles). Not only was the data stable from day to day, but there are multiple readings at approximately the same temperature that all overlap. This shows that the ErAG temperature sensor can be calibrated to be highly accurate and precise. We tested the sensor at a maximum temperature of 1777° C. As we crossed 1800° C., the B-type thermocouple stopped working (it most likely melted), so this is the highest confirmed temperature reading. However, the ErAG spectrum was still visible at this point, so higher temperature measurements could be made by extrapolating the curve fit to higher temperatures.

Figure 12:
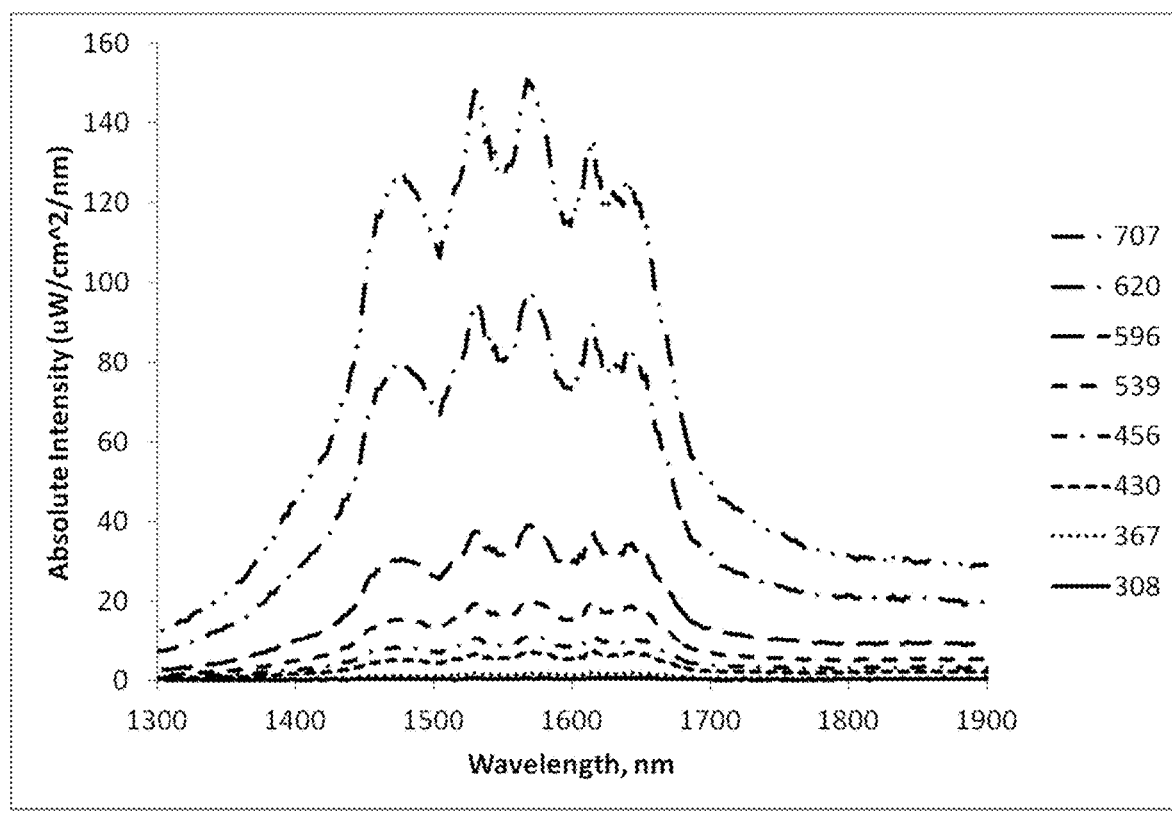
FIG. 12. Near-infrared electromagnetic light emission spectra for erbium aluminum garnet at carrying temperatures.
Figure 13:
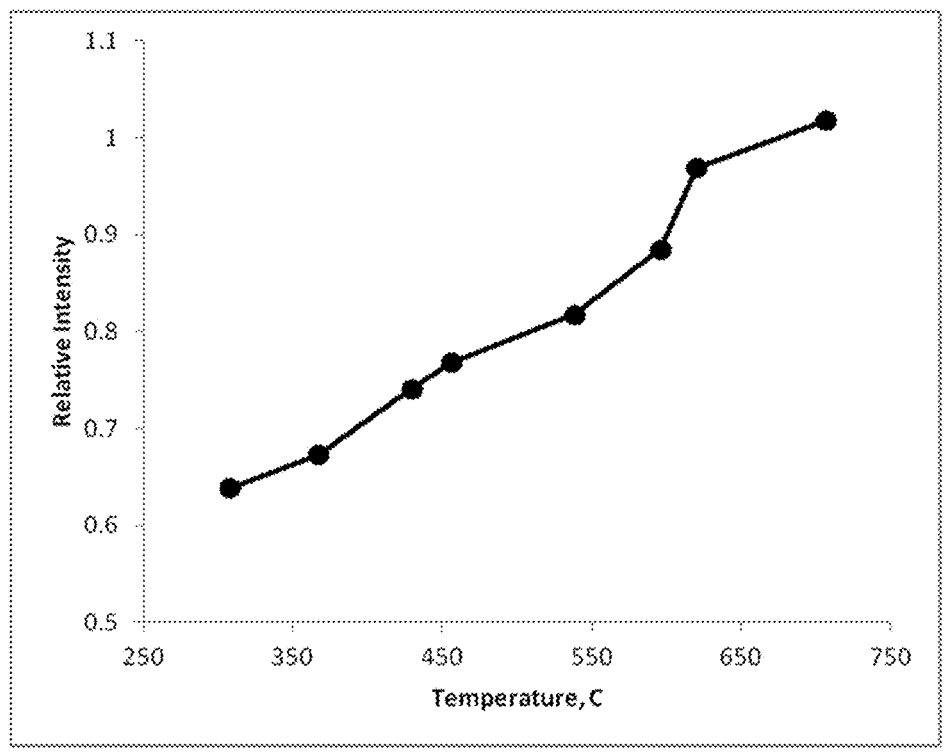
FIG. 13. Using sensor of FIG. 3, the ratio of the light intensity at 1470 nm to 1615 nm as a function of temperature.

We also collected data at low temperatures using a near-infrared (NIR) spectrometer. The spectrometer was nominally rated from 900 nm to 2200 nm. However, the 964 nm line that shows up quite clearly in a visible Mightex spectrometer reading does not show up in the NIR spectrum. We believe that this is due to extremely low sensitivity of the NIR spectrum at this short wavelength. However, there are very clearly spectral peaks around 1500 nm (1477 nm, 1530 nm, 1570 nm, 1615 nm, and 1643 nm)—See FIG. 12. This spectral peak is visible all the way down to 300° C. Additionally, the 964 nm peak that we measured with the Mightext spectrometer is visible down to 500° C. This means that at minimum, the sensor could determine its temperature by comparing the 964 peak to one of the 1500 nm peak down to 500° C. Temperature can be measured down to 300° C. by comparing two of the NIR peaks. for instance, the ratio of the 1477 nm peak to the 1615 nm peak produces the graph shown in FIG. 13. Overall, this means that the sensor will be able to determine temperature from 300° C. to >1800° C.

In the above teaching of the present invention the data from the emission bands is manipulated mathematically, wherein at least two separate selective emission bands are related to each other. The relative differences of the temperature dependence of two more peaks are thus used to evaluate the measured temperature. The relative evaluation may employ a mathematical calculation, and algorithm that is performed by a machine such as a microprocessor or equivalent device, or performed as a look-up table. Other equivalent procedures are also suitable.

Examples of algorithms that can be used to evaluate temperate by relating the emission of a first peak (Em1) and the emission of a second peak (Em2) include:

T is a function of: (Em1/Em2)
T is a function of: (Em1/Em2)+c
T is a function of: x(Em1/Em2)
T is a function of: x(Em1/Em2)+c
T is a function of: (Em1/x*Em2)
T is a function of: (Em1/x*Em2)+c
T is a function of: (x*Em1/Em2)
T is a function of: x(Em1/Em2)+c
T is a function of: Em1−Em2
T is a function of: (x*Em1)−Em2
T is a function of: Em1−(y*Em2)
T is a function of: (x*Em1)−(y*Em2)

"T" means the temperature measured at the rare earth emitter. The symbols "x" "y" and "c" are adjustable constants that can be used to improve the accuracy of curve fitting the data. When more than two peaks are measured and used, Em1 and Em2 can be replaced with Em3 and Em4, for example. The above list of example algorithms should not be interpreted as an exhaustive list. Other variations that relate one emission to another emission should also be considered suitable algorithms under the definition of the "relative algorithm(s)" above. The term "an algorithm relating two more emission peaks" means the equations above and any other equation containing either a ratio of two peaks, a scaled ratio of two peaks, a differences between two peaks or a differences of two scaled peaks. Additional peak emissions may be included in each example of the algorithm.

Although the present invention has been described in considerable detail with reference to certain preferred versions thereof, other versions are possible. Therefore, the spirit and scope of the appended claims should not be limited to the description of the preferred versions contained herein, except where required by 35 U.S.C. ¶ 112 ¶6 or 35 U.S.C. § 112 (f). For example, the present invention could have an additional ability to independently measure background light (for example from black or grey body emissions) and have the ability to correct for this background light to make an even more accurate temperature sensor. This could be done with the addition of more filters and detectors than described above.

The reader's attention is directed to all references which are filed concurrently with this specification and which are incorporated herein by reference.

All the features in this specification (including any accompanying claims, abstract, and drawings) may be replaced by alternative features serving the same, equivalent or similar purpose, unless expressly stated otherwise. Thus, unless expressly stated otherwise, each feature disclosed in one example only of a generic series of equivalent of similar features.

What is claimed is:

1. A thermally luminescent temperature sensor, comprising:
   a rare earth emitter having a first selective electromagnetic light energy emission band and a second selective electromagnetic light energy emission band,
   wherein, in response to a temperature, the rare earth emitter converts thermal energy to electromagnetic light energy within the first selective energy emission band and electromagnetic light energy within the second selective energy emission band;
   a selective optical detector in optical communication with the rare earth emitter, wherein the selective optical detector independently detects each the first selective electromagnetic light energy emission band and the second selective electromagnetic light energy emission band; and
   wherein the thermally luminescent temperature sensor determines the temperature based on the electromagnetic light energy measured within the first selective energy emission band relative to the electromagnetic light energy measured within the second selective energy emission band.

2. The thermally luminescent temperature sensor of claim 1, wherein the thermally luminescent temperature sensor determines the temperature using an algorithm that comprises the ratio of the electromagnetic light energy within the first selective energy emission band to the electromagnetic light energy within the second selective energy emission band.

3. The thermally luminescent temperature sensor of claim 1, wherein the thermally luminescent temperature sensor determines the temperature using an algorithm that comprises the difference of the electromagnetic light energy within the first selective energy emission band and the electromagnetic light energy within the second selective energy emission band.

4. The thermally luminescent temperature sensor of claim 1, wherein the rare earth emitter comprises a rare earth aluminum garnet.

5. The thermally luminescent temperature sensor of claim 4, wherein the rare earth emitter comprises $Er_3Al_5O_{12}$.

6. The thermally luminescent temperature sensor of claim 5, wherein the first selective electromagnetic light energy band is centered at 790 nm and the second selective electromagnetic light energy band is centered at 964 nm.

7. The thermally luminescent temperature sensor of claim 1, wherein the first selective electromagnetic light energy band and the second selective electromagnetic light energy band have a bandwidth of at most 50 nm.

8. The thermally luminescent temperature sensor of claim 7, wherein the first selective electromagnetic light energy band and the second selective electromagnetic light energy band have a bandwidth of at most 2.5 nm.

9. The thermally luminescent temperature sensor of claim 1, further comprising a light pipe having a first end and a second end, the first end communicating with the rare earth emitter and the second end communicating with the selective optical detector.

10. The thermally luminescent temperature sensor of claim 9, wherein the light pipe comprises a sapphire optical fiber.

11. A thermally luminescent temperature sensor, comprising:
    a rare earth emitter having a first selective electromagnetic light energy emission band, a second selective electromagnetic light energy emission band, a third selective electromagnetic light energy emission band, and a fourth selective electromagnetic light energy emission band,
    wherein, in response to a temperature, the rare earth emitter converts thermal energy to electromagnetic light energy within the first selective energy emission band, the second selective electromagnetic light energy emission band, the third selective electromagnetic light energy emission band, and the fourth selective electromagnetic light energy emission band;
    a selective optical detector in optical communication with the rare earth emitter, wherein the selective optical detector independently detects each the first selective electromagnetic light energy emission band, the second selective electromagnetic light energy emission band, the third selective electromagnetic light energy emission band, and the fourth selective electromagnetic light energy emission band; and
    wherein the thermally luminescent temperature sensor determines the temperature based on the electromagnetic light energy measured within the first selective energy emission band relative to the electromagnetic light energy measured within the second selective energy emission band, and the electromagnetic light energy measured within the third selective energy emission band relative to the electromagnetic light energy measured within the fourth selective energy emission band.

12. The thermally luminescent temperature sensor of claim 11, wherein the thermally luminescent temperature sensor determines the temperature using an algorithm that comprises the ratio of the electromagnetic light energy within the first selective energy emission band to the electromagnetic light energy within the second selective energy emission band.

13. The thermally luminescent temperature sensor of claim 11, wherein the thermally luminescent temperature sensor determines the temperature using an algorithm that comprises the difference of the electromagnetic light energy within the first selective energy emission band and the electromagnetic light energy within the second selective energy emission band,
  wherein the thermally luminescent temperature sensor evaluates the temperature using an algorithm that comprises the ratio of the energy within the first selective electromagnetic light energy emission band to the energy within the second selective electromagnetic light energy emission band and the ratio of the third selective electromagnetic light energy emission band to the fourth selective electromagnetic light energy emission band.

14. The thermally luminescent temperature sensor of claim 11, wherein the rare earth emitter comprises a rare earth aluminum garnet.

15. The thermally luminescent temperature sensor of claim 11, wherein the rare earth emitter comprises $Er_3Al_5O_{12}$.

16. The thermally luminescent temperature sensor of claim 15, wherein the first selective electromagnetic light energy band is centered at 790 nm, the second selective electromagnetic light energy band is centered at 964 nm, the third selective electromagnetic light energy band is centered at 1470 nm, and the fourth selective electromagnetic light energy band is centered at 1615 nm.

17. The thermally luminescent temperature sensor of claim 11, wherein the first selective electromagnetic light energy band and the second selective electromagnetic light energy band have a bandwidth of at most 50 nm.

18. The thermally luminescent temperature sensor of claim 11, further comprising a light pipe having a first end and a second end, the first end communicating with the rare earth emitter and the second end communicating with the selective optical detector.

19. The thermally luminescent temperature sensor of claim 18, wherein the light pipe comprises a sapphire optical fiber.

20. The thermally luminescent temperature sensor of claim 11, wherein the selective optical detector further comprises an optical splitter, at least two visible photodiodes and at least two near-infrared photodiodes.

* * * * *